US008159594B2

(12) United States Patent
Nitta et al.

(10) Patent No.: US 8,159,594 B2
(45) Date of Patent: Apr. 17, 2012

(54) ELECTRONIC DEVICE

(75) Inventors: Keiichi Nitta, Kawasaki (JP); Hirotake Nozaki, Port Washington, NY (US)

(73) Assignee: Nikon Corporation, Tokyo (JP)

( * ) Notice: Subject to any disclaimer, the term of this patent is extended or adjusted under 35 U.S.C. 154(b) by 1284 days.

(21) Appl. No.: 11/658,876

(22) PCT Filed: Sep. 9, 2005

(86) PCT No.: PCT/JP2005/016628
§ 371 (c)(1),
(2), (4) Date: Mar. 13, 2007

(87) PCT Pub. No.: WO2006/033245
PCT Pub. Date: Mar. 30, 2006

(65) Prior Publication Data
US 2007/0249396 A1    Oct. 25, 2007

(30) Foreign Application Priority Data
Sep. 21, 2004 (JP) ................. 2004-273416

(51) Int. Cl.
*H04N 5/222* (2006.01)
(52) U.S. Cl. ................. 348/333.1; 348/208.99
(58) Field of Classification Search ............. 348/208.99, 348/333.1
See application file for complete search history.

(56) References Cited

U.S. PATENT DOCUMENTS

| | | | | |
|---|---|---|---|---|
| 5,428,391 A | * | 6/1995 | Murata et al. | 348/240.2 |
| 6,750,832 B1 | | 6/2004 | Kleinschmidt | |
| 7,187,343 B2 | * | 3/2007 | Pate | 345/1.2 |
| 2002/0171637 A1 | | 11/2002 | Kadowaki et al. | |
| 2003/0038927 A1 | * | 2/2003 | Alden | 353/122 |
| 2004/0141162 A1 | * | 7/2004 | Olbrich | 353/119 |
| 2004/0252220 A1 | * | 12/2004 | Oda et al. | 348/333.06 |
| 2005/0024606 A1 | * | 2/2005 | Li et al. | 353/121 |
| 2005/0099607 A1 | | 5/2005 | Yokote et al. | |
| 2006/0152478 A1 | | 7/2006 | Simon | |

FOREIGN PATENT DOCUMENTS

| | | |
|---|---|---|
| JP | A 5-80925 | 4/1993 |
| JP | A 5-137039 | 6/1993 |
| JP | A 6-118342 | 4/1994 |

(Continued)

OTHER PUBLICATIONS

Supplementary European Search Report dated Oct. 21, 2009 for European Patent Application No. EP 05 78 1973.

(Continued)

*Primary Examiner* — Anthony J Daniels
(74) *Attorney, Agent, or Firm* — Oliff & Berridge, PLC

(57) ABSTRACT

A portable telephone device with incorporated projector 10 starts projection by a projection module 6 when a relative angle θ is set to a projection attitude of 80° and three seconds elapses. If a setting is made for performing vibration correction processing, then a camera unit 200 is commanded to start image-capturing or photographing frame pictures continuously. The portable telephone device with incorporated projector 10 calculates six movement vectors by comparing pictures between successive frames photographed by an image sensor. Along with deciding upon "hand tremor" based upon the movement vectors which are calculated, moreover a representative vector is calculated. The portable telephone device with incorporated projector 10 further creates picture shift information for canceling the representative vector, and, if "hand tremor" has been decided upon, suppresses vibration or wobbling of the contents projected by the projector module using the picture shift information.

12 Claims, 8 Drawing Sheets

FOREIGN PATENT DOCUMENTS

| | | | |
|---|---|---|---|
| JP | 06269002 A * | 9/1994 | |
| JP | A-06-269002 | 9/1994 | |
| JP | A 11-164291 | 6/1999 | |
| JP | A 2001-24926 | 1/2001 | |
| JP | A 2001-251476 | 9/2001 | |
| JP | A 2003-29204 | 1/2003 | |
| JP | A 2003-29927 | 1/2003 | |
| JP | A 2003-233126 | 8/2003 | |
| JP | A 2003-283964 | 10/2003 | |
| WO | WO 2004/070485 A1 | 8/2004 | |

OTHER PUBLICATIONS

Aug. 11, 2011 Office Action issued in European Patent Application No. 05781973.2.

* cited by examiner (a)

(b)

(a)

(b)

(a)

(b)

(c)

ELECTRONIC DEVICE

TECHNICAL FIELD

The present invention relates to an electronic device including a projector device which projects information such as pictures or text or the like.

BACKGROUND ART

A projector device comprising a camera which photographs an object to be photographed mounted upon a mounting stand, and which projects a picture photographed by the camera upon a screen or the like, is known (refer to Patent Reference #1).
Patent Reference #1:
Japanese Laid Open Patent Publication 2001 251476.

DISCLOSURE OF THE INVENTION

Problems to be Solved by the Invention

If the projector device consists of a compact device which can be hand-held, then it is considered that the projector device may wobble during projection, along with trembling of the user's hand. Since, due to this, the image which is being projected upon the screen will also wobble undesirably, accordingly there is a risk of imparting an uncomfortable feeling to the observer of the projected image.

Means for Solving The Problems

According to the first aspect of the invention, an electronic device, comprises: an image-capturing device that captures an image of a subject and outputs an image signal; a projector device that projects an image formed by an optical image formation element, housed integrally within a body; a calculation unit that calculates an amount of change of the image signal with time; and a correction unit that corrects a position of the image projected by the projector device upon a screen that is remote from the body, according to the calculated amount of change.

According to the second aspect of the invention, an electronic device according to the first aspect of the invention may further comprise: a change unit that changes at least one of an orientation at which the image-capturing device captures an image and an orientation at which the projector device projects an image, so that an image-capturing range of the image-capturing device and a projection range of the projector device do not coincide with one another. And the calculation unit can calculate the amount of change using an image signal corresponding to the image of the subject excluding the projection range by the projector device.

According to the third aspect of the invention, an electronic device according to the first aspect of the invention may further comprise: a range change unit that changes at least one of a size of an image-capturing range in which the image-capturing device captures an image and a size of a projection range in which the projector device projects an image, so that the image-capturing range of the image-capturing device and the projection range of the projector device do not coincide with one another. And the calculation unit can calculate the amount of change using an image signal corresponding to the image of the subject excluding the projection range by the projector device.

According to the fourth aspect of the invention, in an electronic device according to the third aspect of the invention, it is preferred that the range change unit changes the image-capturing range or the projection range, so that the image-capturing range becomes larger than the projection range.

According to the fifth aspect of the invention 5, in an electronic device according to the third or fourth aspect of the invention, it is preferred that if the amount of change cannot be calculated by the calculation unit, the projector device narrows down the projection range, and the calculation unit widens an image signal extraction range used in a calculation of the amount of change.

According to the sixth aspect of the invention, in an electronic device according to the third or fourth aspect of the invention, it is preferred that if the amount of change cannot be calculated by the calculation unit, the image-capturing device widens the image-capturing range, and the calculation unit widens an image signal extraction range used in a calculation of the amount of change.

According to the seventh aspect of the invention, in an electronic device according to the fifth or sixth aspect of the invention, it is preferred that the projector device irradiates illumination light upon a periphery within the projection range.

According to the eighth aspect of the invention, an electronic device may comprise: an image-capturing device that captures an image of a subject and outputs an image signal, and an integrally provided projector device that projects an image formed by an optical image formation element; a vibration detection unit that detects vibration and outputs a vibration detection signal; and a correction unit that corrects a picture corresponding to the image signal outputted by the image-capturing device, and the image projected by the projector device, based upon the vibration detection signal.

According to the ninth aspect of the invention, in an electronic device according to the eighth aspect of the invention, it is preferred that when the vibration has been detected by the vibration detection unit, the correction unit performs correction by changing shift directions of the picture and of the image conversely when correcting the picture corresponding to the image signal outputted by the photographic device, and when correcting the image projected by the projector device.

According to the tenth aspect of the invention, in an electronic device according to any one of the first through ninth aspect of the invention, it is preferred that the image-capturing device starts image-capturing according to a command for starting projection by the projector device.

According to the eleventh aspect of the invention, in an electronic device according to any one of the first through tenth aspect of the invention, it is preferred that the projector device prohibits the projection of the image formed using the image signal outputted from the image-capturing device, when the correction unit is performing correction.

According to the twelfth aspect of the invention, an electronic device according to any one of the first through seventh aspect of the invention may further comprise: an exposure calculation unit that determines an exposure during image-capturing by the image-capturing device, based upon a luminance of the subject. And the exposure calculation unit can calculate the luminance of the subject using an image signal that corresponds to the image of the subject excluding a projection range by the projector device.

According to the thirteenth aspect of the invention, an electronic device may comprise: an image-capturing device that captures an image of a subject and outputs an image signal, and an integrally provided projector device that projects an image formed by an optical image formation element; a control unit that controls the image-capturing device and the projector device by time division, so that, image-capturing is performed when projection is not being performed by the projector device, and projection is performed when image-capturing is not being performed by the image-capturing device; a calculation unit that calculates an amount of change of the image signal with time; and a correction unit that corrects a position of the image projected by the projector device, according to the calculated amount of change.

According to the fourteenth aspect of the invention, in an electronic device according to the thirteenth aspect of the invention, it is preferred that the control unit performs control so that a period of projection by the projector device is less than or equal to $\frac{1}{30}$ second.

According to the fifteenth aspect of the invention, an electronic device according to any one of the twelfth through fourteenth aspect of the invention may further comprise: a level increase processing unit that increases a level of the image signal corresponding to the image of the subject excluding the projection range by the projector device. And the calculation unit can calculate the amount of change using the image signal upon which a level increase processing has been performed.

The above described calculation unit could be replaced by a calculation means.

The above described correction unit could be replaced by a correction means.

The above described change unit could be replaced by a change means.

The above described range change unit could be replaced by a range change means.

The above described tremble detection unit could be replaced by a tremble detection means.

The above described exposure calculation unit could be replaced by an exposure calculation means.

The above described control unit could be replaced by a control means.

The above described level increase processing unit could be replaced by a level increase processing means.

Advantageous Effect of the Invention

With the electronic device according to the present invention, when using the projector device in the state in which the electronic device is hand-held, it is possible to alleviate any uncomfortable feeling imparted to a person who is observing the projected image.

BEST MODE FOR CARRYING OUT THE INVENTION

In the following, preferred embodiments for implementing the present invention will be explained.

First Embodiment

Figure 1:
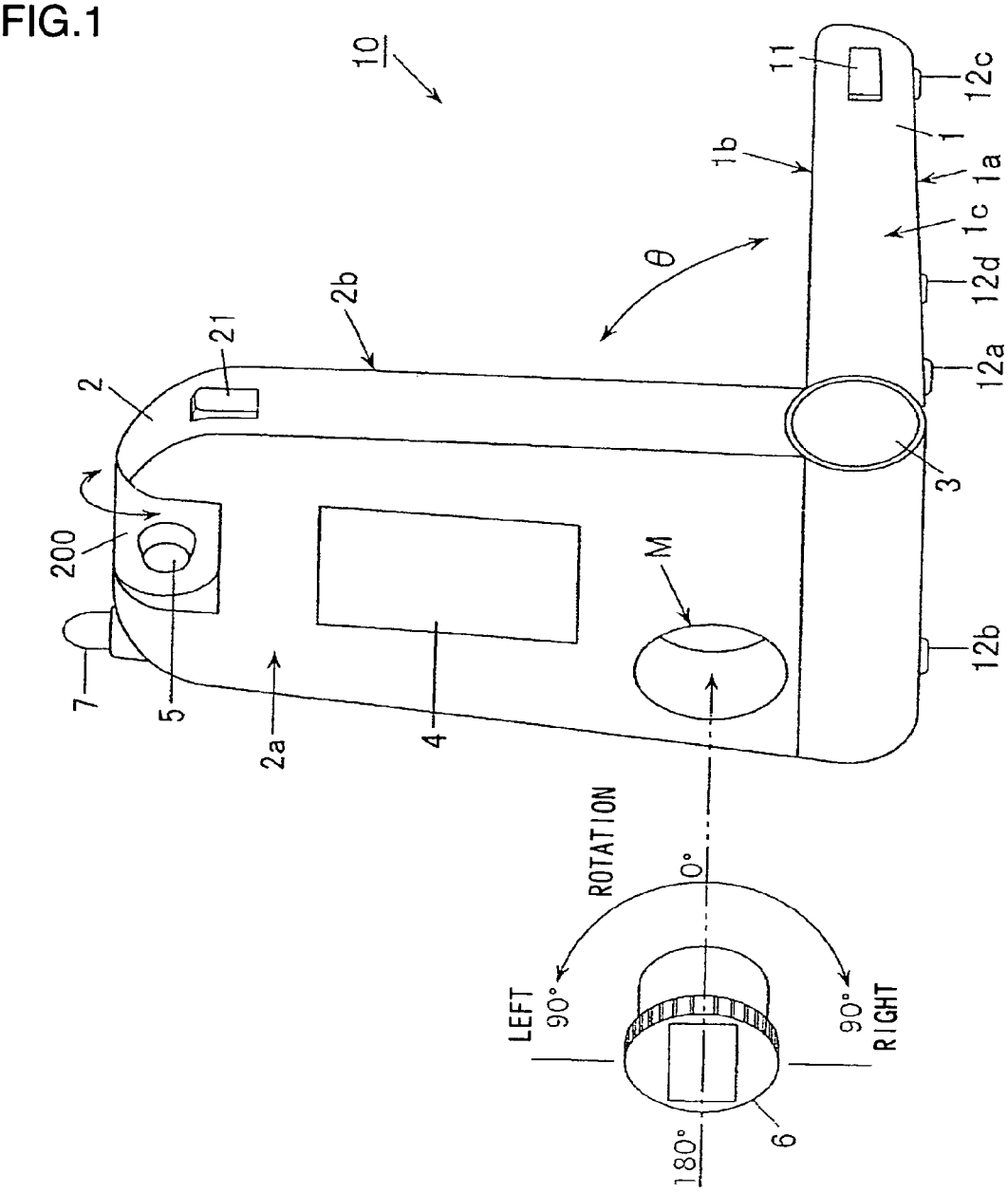
FIG. 1 is a perspective view of a portable telephone device with incorporated projector according to an embodiment of the present invention.

FIG. 1 is a perspective view of a portable telephone device with incorporated projector 10 which can be used while being hand-held, according to an embodiment of the present invention. In this portable telephone device with incorporated projector 10 of FIG. 1, a body comprising an actuation section 1 and a display section 2 is supported by a rotatable folding hinge unit 3, with this folding hinge unit 3 being adapted so as to fold freely by rotating about its center. A click mechanism (not shown in the figures) is provided to the folding hinge unit 3, so that the relative angle θ between the actuation section 1 and the display section 2 can be positioned, for example, to a 80° position and to a 150° position. The 80° position corresponds to an attitude for projection by the projector unit, while the 150° position corresponds to an attitude for conversation with the telephone device.

Compact foot portions 12a~12d are provided to the bottom surface 1a of the actuation section 1, so as to stabilize this portable telephone device with incorporated projector 10 when it has been laid upon a planar surface. A first actuation member 112 and the like which will be described hereinafter are provided upon the surface 1b of the actuation section 1 on the side of the display section 2, and a compact foot portion 11 is provided upon a side 1c of the actuation section 1. This compact foot portion 11 is adapted so that, when the portable telephone device with incorporated projector 10 is laid upon a planar surface with the side 1c facing downwards (i.e. is laid in a horizontal position) in the state in which the relative angle θ of the portable telephone device with incorporated projector 10 has been opened up to 80° as shown in FIG. 1 (i.e. the projection attitude), then the telephone device with incorporated projector 10 is laid stably upon three points: this compact foot portion 11, and also the folding hinge unit 3 and a compact foot portion 21 which is provided upon the display section 2.

A main liquid crystal unit 204 which will be described hereinafter is disposed upon the surface 2b of the display section 2 on the side of the actuation section 1, and a sub liquid crystal display unit 4 is disposed upon the outside surface 2a of the display section 2. A camera unit 200 and a projector module 6 are also both disposed upon the surface 2a of the display section 2. This projector module 6 is made in a cylindrical shape and fits into a round hole M which is provided upon the surface 2a of the display section 2 so as to rotate freely therein, with a click mechanism (not shown in the figures) being provided to click at a total of three spots: a fundamental position (taken as being 0°) shown in FIG. 1, and two positions in which the projector module 6 has been rotated at 90° from this fundamental position to orientations respectively on the left and the right with reference to that fundamental position.

The camera unit 200 is provided to the display section 2. The camera unit 200 is provided with a rotation mechanism, so that it is possible to point the orientation of the photographic lens 5 towards the outer side 2a of the display section 2, or to point it back towards the surface 2b on side towards the actuation section 1; and this mechanism is made so that the orientation in which the camera unit photographs can freely change with respect to the body.

Figure 2:
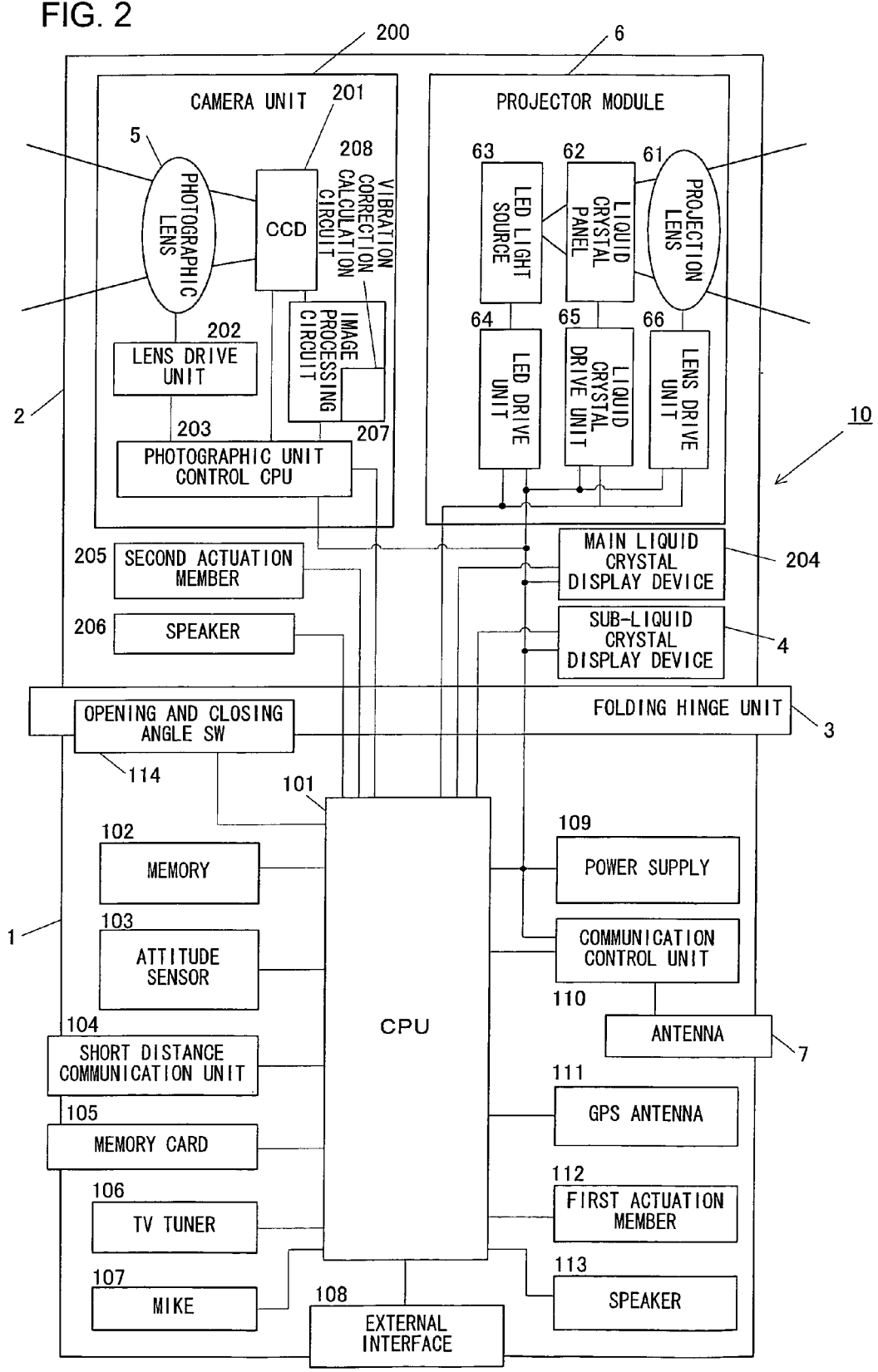
FIG. 2 is a block diagram for explanation of the structure of this portable telephone device with incorporated projector.

FIG. 2 is a block diagram for explanation of the structure of the portable telephone device with incorporated projector 10 of FIG. 1. In FIG. 2, to the side of the actuation section 1, there are provided a CPU 101, a memory 102, an attitude sensor 103, a short distance communication unit (circuit) 104, a TV tuner 106, a mike 107, an external interface (I/F) 108, a power supply 109, a communication control unit (circuit) 110, an antenna 7, a GPS antenna 111, a first actuation member 112, a speaker 113, and an opening and closing angle switch (SW) 114; and a removable memory card 105 is also implemented.

To the display section 2, there are provided a camera unit 200, the projector module 6 (the projector unit), a second actuation member 205, a speaker 206, the main liquid crystal unit 204, and the sub liquid crystal unit 4.

Based upon a control program, the CPU 101, which is a controller, performs predetermined calculation and the like using signal inputted from various units incorporated in this portable telephone device with incorporated projector 10, and controls each of telephone device operation, camera operation, and projector operation by sending control signals to various units of this portable telephone device with incorporated projector 10. It should be understood that this control program is stored in a non-volatile memory (not shown in the figures) within the CPU 101.

The memory 102 is used as a working memory for the CPU 101. The attitude sensor 103 detects the attitude of this portable telephone device with incorporated projector 10, and sends its detection signal to the CPU 101. Due to this, the CPU 101 acquires top and bottom information which specifies the top and the bottom of an image during photography (including information for identifying photography with the camera in the vertical position and photography with the camera in the horizontal position), and, when the projector is being used, decides whether it is placed in the vertical position as shown in FIG. 1, or is placed in the horizontal position with the compact foot portions 11 and 21 and the folding hinge unit 3 downwards.

The short distance communication unit 104 may comprise, for example, an infrared radiation communication circuit, and transmits and receives data to and from an external device upon command by the CPU 101. The TV tuner 106 receives a television broadcast upon command by the CPU 101. The CPU 101 displays the received image upon the main liquid crystal display unit 204, and replays the received audio upon the speaker 206. The memory card 105 comprises a non-volatile memory, and, upon command by the CPU 101, it is possible to write, store, and read out data such as, for example, image data outputted by the camera unit 200, images and audio data outputted by the TV tuner 106, and the like.

The mike 107 converts audio which has been captured into an electrical signal and sends it to the CPU 101 as an audio signal. This audio signal is recorded in the memory card 105 during sound recording, and is sent to the communication control unit 110 during conversation. The external interface 108 transmits and receives data to and from an external device via a cable or a cradle, not shown in the figures, upon command by the CPU 101.

The speaker 113 replays the audio of an audio signal outputted from the CPU 101. The first actuation member 112 includes dial buttons for a telephone device and the like, and sends actuation signals to the CPU 101 corresponding to the buttons which are pressed. The GPS antenna 111 receives signals from GPS satellites, and sends the received data to the CPU 101. The CPU 101 is adapted to be able to calculate positional information using this data received from the GPS antenna 111. The communication control unit 110 includes a wireless transmission and reception circuit, and performs communication with other telephone devices via a base station not shown in the figures, upon command by the CPU 101. This communication control unit 110 is adapted so as to be able to transmit and receive, not only telephone audio, but also image data which has been photographed by the camera unit 200, image data for projection by the projector module 6, and the like. And the antenna 7 is a transmission and reception antenna for the communication control unit 110.

The power supply 109 may consist of, for example, a removable battery pack and a DC/DC conversion circuit or the like, and supplies the various sections within the portable telephone device with incorporated projector 10 with the electrical power which they require. The opening and closing angle SW 114 detects the rotational angle of the folding hinge unit 3, and if, for example, the relative angle θ between the actuation section 1 and the display section 2 is 80°, it sends an ON signal (H level) to the CPU 101, while if this relative angle θ is any other angle, then it sends an OFF signal (L level).

The main liquid crystal display unit 204 displays information such as an image or text or the like upon a command from the CPU 101. The sub liquid crystal display unit 4 also displays information such as an image or text or the like upon a command from the CPU 101. The contents which are described as text information may be, for example, the operational state of the portable telephone device with incorporated projector 10, an actuation menu, the contents of a transmitted or received email, or the like. Furthermore, the main liquid crystal display unit 204 is adapted to be able to display the same image as the image which is being projected by the projector module 6. The second actuation member 205 includes a button or the like which is related to the displayed contents upon the main liquid crystal display unit 204, and sends an actuation signal to the CPU 101 according to this button being depressed. And the speaker 206 replays audio which is outputted from the CPU 101 as a sound signal, during the conversation attitude when the relative angle θ is 150°.

The camera unit 200 comprises a photographic lens 5, an image sensor 201, a lens drive unit (circuit) 202, a photographic unit control CPU 203 which is a controller, and a image processing circuit 207. As the image sensor 201, a CCD or a CMOS photographic element or the like may be used. The photographic unit control CPU 203, along with drive controlling the image sensor 201 and the lens drive unit 202 according to commands from the CPU 101, also causes predetermined image processing to be performed by the image processing circuit 207. The image processing circuit 207 comprises a vibration correction calculation circuit 208, and, apart from performing white balance processing, gamma processing, shading correction processing and the like upon the accumulated electric charge signal outputted from the image sensor 201, also performs vibration correction processing with this vibration correction calculation circuit 208. This vibration correction is for correcting vibration or wobbling (hand trembling) of the photographic picture caused by photography being performed with the camera unit 200 while this portable telephone device with incorporated projector 10 is being hand-held, and for correcting wobbling of the projected picture caused by projection being performed by the projector module 6 with the portable telephone device with incorporated projector 10 being hand-held.

Upon receipt of a zoom control signal from the camera control CPU 203, the lens drive unit 202 drives a zoom lens (not shown in the figures) which is incorporated in the photographic lens 5 to a tele side or to a wide side. The photographic lens 5 images an image of the subject or the object to be photographed upon the photographic surface of the image sensor 201. The photographic unit control CPU 203 starts image-capturing by the image sensor 201, and, after image-capturing has terminated, reads out the accumulated electric charge signals from the image sensor 201 and sends them to the image processing circuit 207, and sends the image data which has been image processed by the image processing circuit 207 to the CPU 101. It should be understood that, when image data which has been captured by the camera unit 200 is to be transmitted, image data is sent from the CPU 101 to the communication control unit 110. Furthermore, when a photographic image is to be projected, image data is sent from the camera control CPU 203 via the CPU 101 to the projector module 6. In the CPU 101, which is an image processing circuit, trapezoidal deformation correction (keystone correction) processing is performed upon the image data to be projected by the projector module 6.

The projector module 6 comprises a projection lens 61, a liquid crystal panel 62, a LED light source 63, a LED drive unit (circuit) 64, a liquid crystal drive unit (circuit) 65, and a lens drive unit (circuit) 66. The LED drive unit 64 supplies electrical current to the LED light source 63 according to a LED drive signal which is outputted from the CPU 101. And the LED light source 63 illuminates the liquid crystal panel 62 at a brightness corresponding to the electrical current which is supplied.

The liquid crystal drive unit 65 generates a liquid crystal panel drive signal corresponding to the image data, and, by using this generated drive signal, drives the liquid crystal panel 62. In concrete terms, in the liquid crystal layer, a voltage is applied to each of the picture elements in correspondence to the image signal. The arrangement of the liquid crystal molecules changes in the liquid crystal layer to which voltage has thus been applied, and the optical transmittivity of this liquid crystal layer changes. By modulating the light from the LED light source 63 in this manner according to the image signal, the liquid crystal panel 62 creates an optical image.

Based upon a control signal outputted from the CPU 101, the lens drive unit 66 drives the projection lens 61 forwards and backward along a direction which is orthogonal with respect to the optical axis of the projection lens 61. The projection lens 61 projects the optical image which has been emitted from the liquid crystal panel 62 towards the screen or the like.

Figure 3:
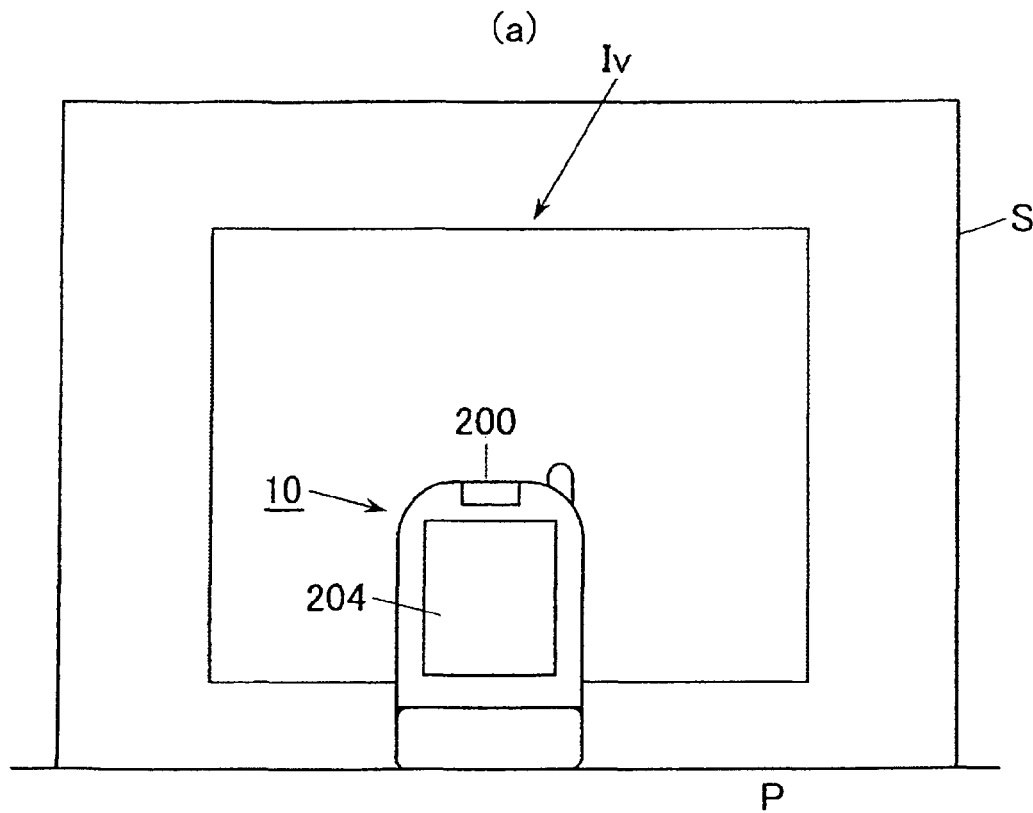
FIG. 3 is a figure for explanation of the image projected by this portable telephone device with incorporated projector: (a) is a figure showing the screen as seen in a straight on orientation, while (b) is a figure showing the screen as seen from its right side.
Figure 3:
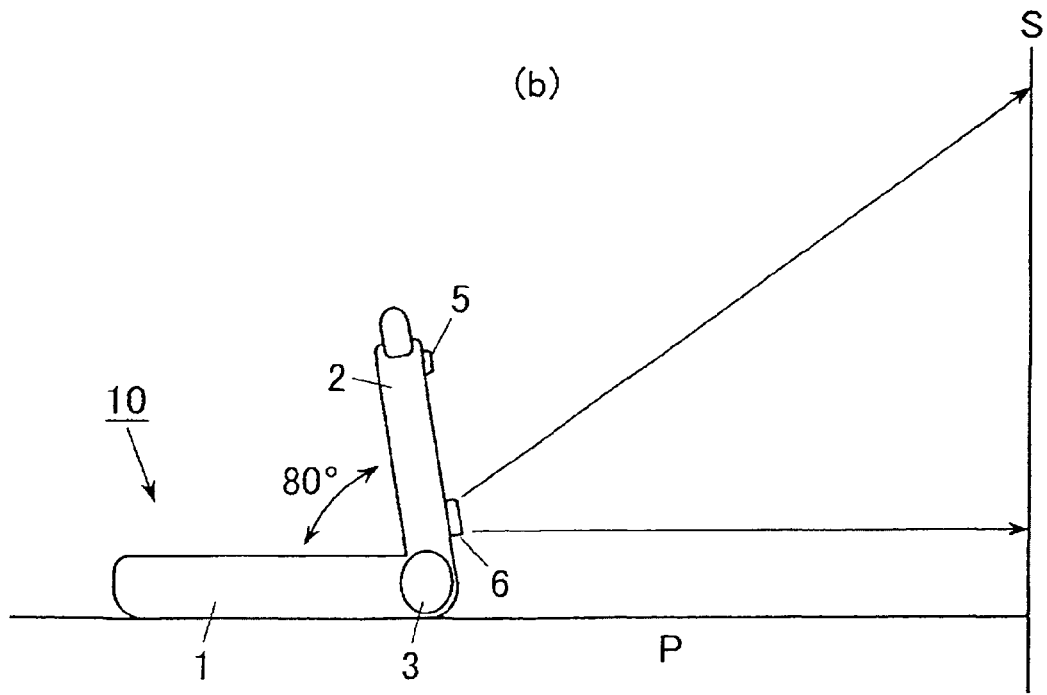

The projection of an image by the projector module 6 will now be explained in detail. With this portable telephone device with incorporated projector 10, projection is started automatically if the relative angle between the actuation section 1 and the display section 2 is set to the projection attitude of 80°, and a predetermined time period (for example 3 seconds) elapses. FIG. 3 is a figure for explanation of the image Iv projected from this portable telephone device with incorporated projector 10 which is mounted upon a plane P in the above described vertical position, upon a screen S separated by a certain distance: FIG. 3(*a*) is a figure showing the screen S as seen in a straight on orientation, while (b) is a figure showing the screen S as seen from its right side.

The projector module 6 has a function of correcting the shape of the projection image Iv, as follows. That is, a perspective effect is obtained by shifting the projection lens 61 with the lens drive unit 66 in a direction orthogonal to the optical axis, and keystone correction (trapezoidal deformation correction) is performed for the display data which is projected, according to this lens movement effect. Due to this, the projection image Iv is corrected to a square shape.

The vibration correction processing which is performed by the above described vibration correction calculation circuit 208 will now be explained in detail. In the state in which a setting is made for vibration correction processing to be performed, the image data is outputted from the image sensor and is signal processed by the image processing circuit 207 one frame at a time, and is sequentially inputted to the vibration correction calculation circuit 208. The vibration correction calculation circuit 208 extracts a plurality of blocks (for example, 6 blocks) from predetermined regions which are determined advance within one inputted frame picture. It should be understood that this setting in order for vibration correction processing to be performed is made by a menu setting or by actuation or the like with the second actuation member 205.

By performing block matching processing for each of the pictures of the six blocks which have been extracted, the vibration correction calculation circuit 208 obtains, from the picture of the previous frame, the regions respectively corresponding to the 6 block pictures, and then calculates 6 movement vectors from these block positions and the region positions by the movement vector calculation processing of the known art. And, using these six movement vectors, the vibration correction calculation circuit 208 further, for example, performs averaging processing for size and orientation of each of the movement vectors, so as to calculate a representative vector which represents the whole of the pictures of the six blocks.

And the vibration correction calculation circuit 208 compares together the size and the direction of each of the 6 movement vectors which have been calculated, and decides whether or not the sizes and directions of the various vectors are in agreement. And, if the differences between the sizes of the vectors and also the differences between the directions of the vectors are within a predetermined range which is determined in advance, then the vibration correction calculation circuit 208 considers that the movement of the picture (i.e. positional and temporal variation of the picture) between frames has been created due to "hand tremor"; while, if at least one of differences between the sizes of the vectors and also the differences between the directions of the vectors exceeds the predetermined range, then it considers that the movement of the picture between frames is due to "movement of the subject being photographed".

If the vibration correction calculation circuit 208 has made the above described "hand tremor" decision, then picture shift information is generated for shifting the picture so as to cancel movement of the image due to the above described representative vector. The shift direction of the picture is oriented opposite to the orientation of the representative vector, and the shift amount of the picture has the same size as the representative vector.

This picture shift information can be used for suppressing "hand tremor" caused in the photographic picture during photography by the camera unit 200. In concrete terms, the data for the picture of one frame which is outputted from the image sensor 201 is shifted in the memory space based upon the shift direction and the shift amount which are specified by the picture shift information. As a result, image data (corrected image data) are obtained, in which movement of the picture between frames has been suppressed in the memory space, so as to suppress wobble of the image of the subject to be photographed due to "hand tremor". The image data in which movement has been suppressed in this manner may be recorded as photographic image data in the memory card, which is a recording means, or may be transmitted via the antenna 7 and the external interface 108.

Furthermore, the picture shift information may be used for suppressing vibration caused in a picture or characters or the like (so called projection contents) included in the projection image, during projection by the projection module 6. In concrete terms, the liquid crystal panel drive signal which drives the liquid crystal panel 62 is changed based upon the shift direction and the shift amount which are specified by the picture shift information. In other words, the optical image which is formed upon the liquid crystal panel 62 is shifted so as to suppress wobbling of the projection contents upon the screen S caused by parallel shifting of the portable telephone device with incorporated projector 10 during projection, originating in "hand tremor". As the result of the optical image upon the liquid crystal panel 62 being shifted (i.e. being corrected) in this manner, from the point of view of the observer, the picture or characters or the like which is being projected upon the screen S are seen as stationary.

Since the present invention is particularly distinguished by the fact that wobbling of the contents projected by the projector module 6 is suppressed by using the picture shift information, accordingly further explanation will be provided centering around this point. When as described above the projection attitude is set and a predetermined time period has elapsed, the CPU 101 of the portable telephone device with incorporated projector 10 issues a command to the projector module 6 to start projection. At this time, if a setting is made to perform vibration correction processing, a command is sent to the camera unit 200 to start photographing frame pictures continuously.

Figure 4:
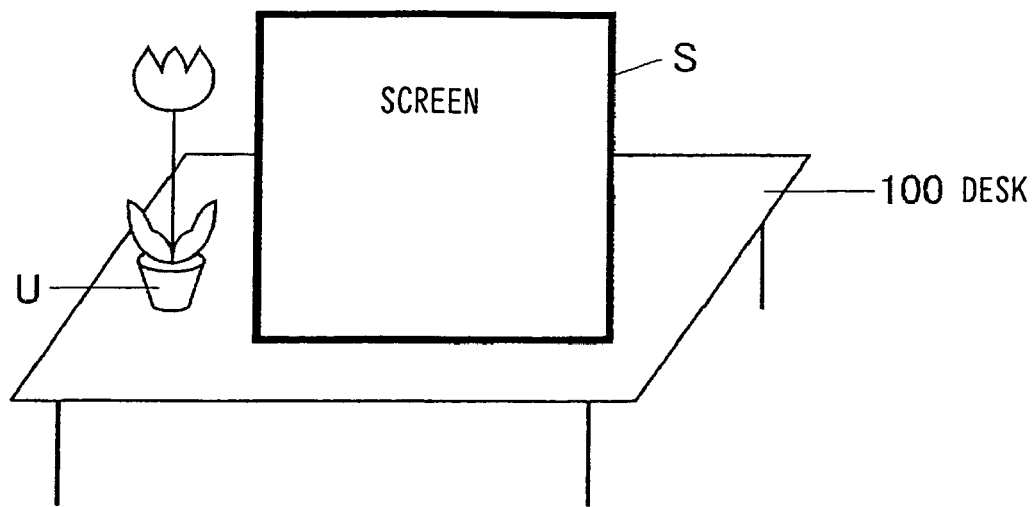
FIG. 4 is a figure for explanation of a screen side structure during suppression of wobbling of the contents being projected by this portable telephone device with incorporated projector.

FIG. 4 is a figure for explanation of the structure on the side of the screen S, during suppression of wobbling of the contents being projected by this portable telephone device with incorporated projector 10. In FIG. 4, the screen S is disposed upon a desk 100, and a flower pot U is disposed adjacent to the screen S. The portable telephone device with incorporated projector 10 is grasped in the hand of the operator in the state of being in its projection attitude as shown in FIG. 1, and the surface 2*a* of the display section 2 (in other words, the projection direction of the projector module 6) and the photographic lens 5 of the camera unit 200 are pointed at the screen S. The desk 100, the flower pot U, and the screen S are stationary objects.

Figure 5:
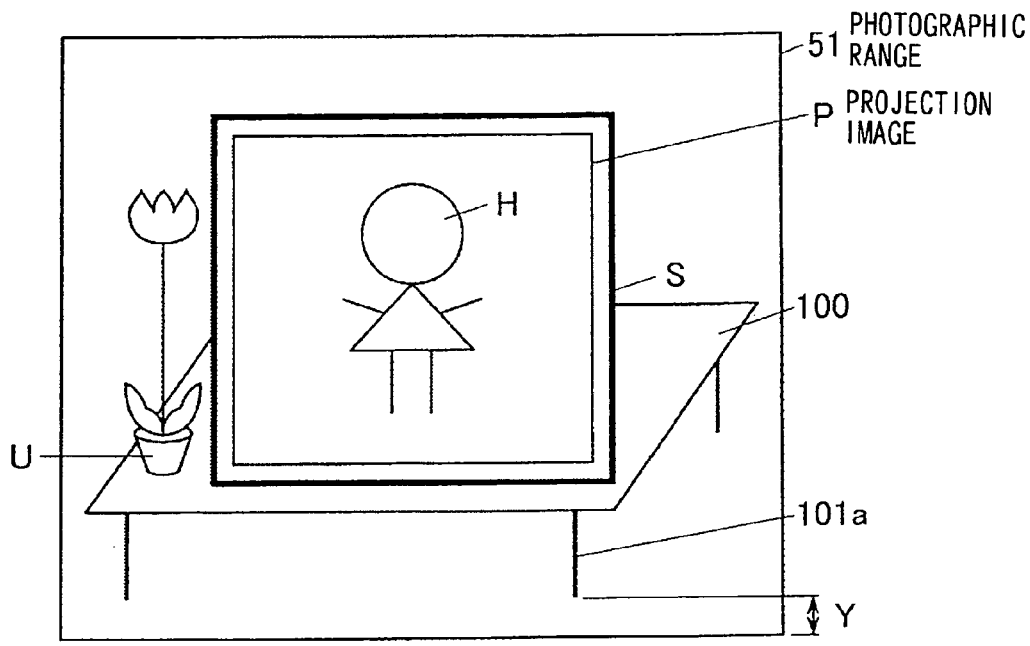
FIG. 5 is a figure showing an example in which a picture is projected by a projector module during photography with a camera unit: (a) is a figure at a time instant tx, while (b) is a figure at a time instant (tx+1)
Figure 5:
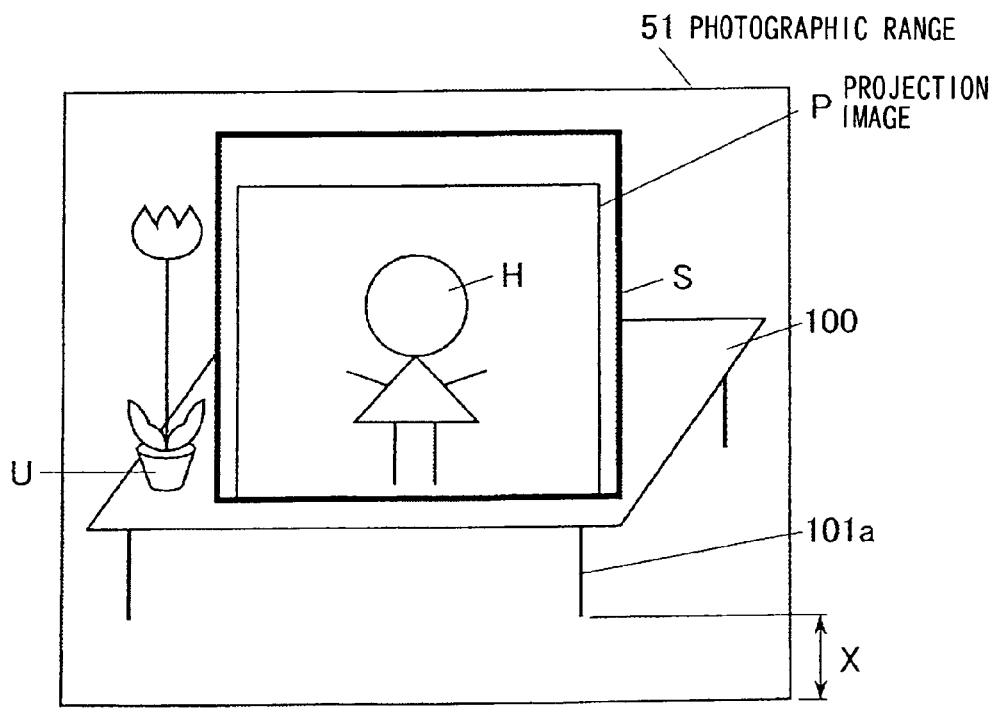

FIG. 5 is a figure showing an example in which a picture is projected by the projector module 6 during photography with the camera unit 200: FIG. 5(*a*) is a figure for explanation of the image-capturing range or the photographic range 51 at a time instant tx, while FIG. 5(*b*) is a figure for explanation of the photographic range 51 at a time instant (tx+1). In FIGS. 5(*a*) and (*b*), the camera unit 200 performs photography so as to include the desk 100, and the screen S and flower pot U upon the desk 100, in the photographic range 51, while the projector module 6 projects the projection picture P towards the screen S. The photographic lens 5 is zoom adjusted, and thereby the photographic angle of view is adjusted, so that the photographic range 51 by the camera 200 is wider than the projection range by the projector module 6.

Figure 6:
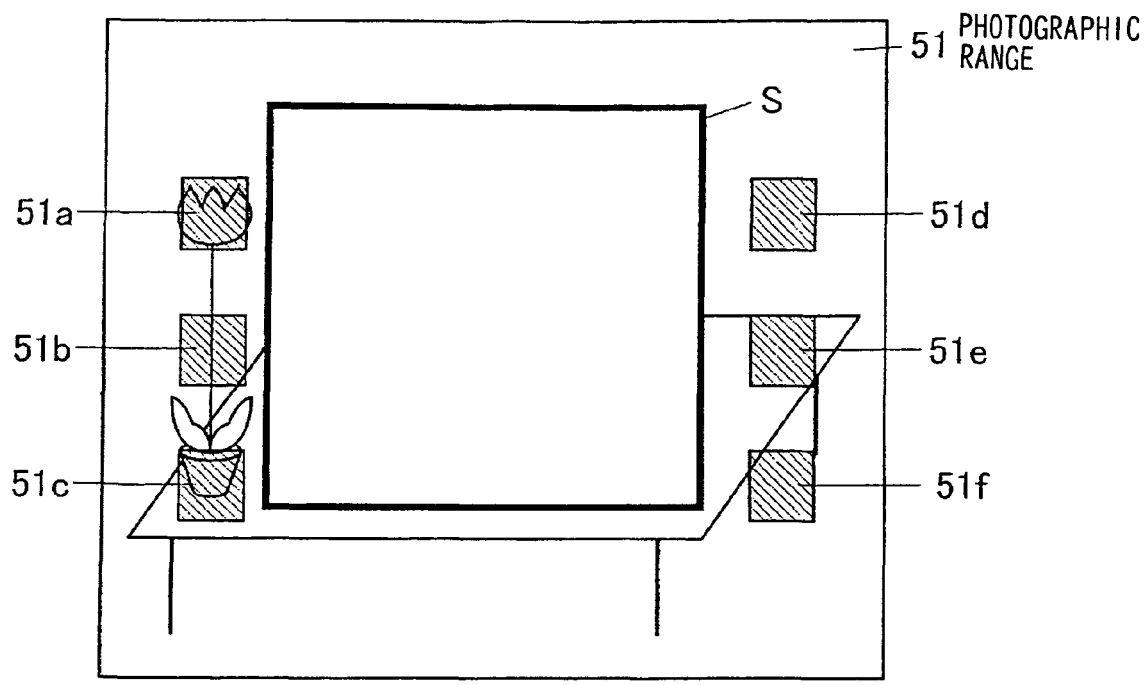
FIG. 6 is a figure for explanation of six blocks within a photographic picture which are not included in a projection range.

In FIG. 5(*a*) which is for the time instant tx, the gap between the right front leg 101*a* of the desk 100 and the edge of the photographic range 51 is Y, while, in FIG. 5(*b*) which is for the time instant (tx+1), the gap between the right front leg 101*a* of the desk 100 and the edge of the photographic range 51 is X. As shown in FIG. 6, the vibration correction calculation circuit 208 extracts, for example, 6 blocks 51*a*~51*f* from within the picture of the photographic range 51 corresponding to one frame of picture, but which do not include the projection range upon the screen S, and obtains the above described picture shift information based upon the image data within these blocks. The blocks 51*a*~51*f* are determined in advance within the photographic range 51, for example in the neighborhood of its border.

The picture within the photographic range 51 of FIG. 5(*a*) corresponds to the photographic picture of the previous frame, while the picture within the photographic range 51 of FIG. 5(*b*) corresponds to the photographic picture of the current frame. Since, according to FIG. 5(*b*), due to hand tremor in the vertical direction, the surface 2*a* of the display section 2 of the portable telephone device with incorporated projector 10 is parallel shifted in the downwards direction as compared to its position in FIG. 5(*a*), accordingly the desk 100, the screen S, and the flower pot U are shifted in the upwards direction, and moreover the person H in the picture P which is being projected upon the screen S is shifted in the downwards direction. Thus a person who is observing the projection picture P upon the screen S will experience discomfort, due to the person H appearing to shift.

Figure 7:
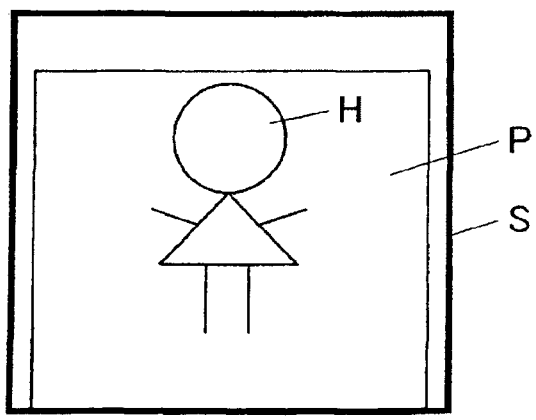
FIG. 7 is a figure for explanation of a picture projected upon a screen after shifting.

Accordingly the CPU 101 issues a command to the liquid crystal drive unit 65 of the projector module 6, so as to shift the optical image upon the liquid crystal panel 62 according to the picture shift information. As a result, as shown in FIG. 7, the person H in the projection picture P upon the screen S is projected upon the central portion of the screen S, in the same manner as in the case of FIG. 5(*a*), and, to a person who is observing the projection picture P upon the screen S, this person H is seen as being stationary.

In the example described above, the position of the image of the person H in the projection picture at the time instant t(x+1) shown in FIG. 5(*b*) is shifted in the downward direction, as compared with the image of the person H in the projection picture of FIG. 5(*a*). Accordingly, in order to cancel this shifting, control is performed so that the position upon the screen S of the image of the person H in the projection picture shifts in the upwards direction (i.e. so as to shift the position of the image in the opposite direction to the shift direction of the projection picture, in other words the direction of the "hand tremor"). Here, the case of application to correction of the photographic picture for hand tremor in the example described above will be explained. The photographic picture at the time instant t(x+1) shown in FIG. 5(*b*) is shifted in the upwards direction, as compared to the photographic picture of FIG. 5(*a*). Accordingly, the start position for the reading out from the memory space of the frame image data which has been photographed as previously described is changed, so as to eliminate this shift. By doing this, correction is performed so that, for example, the picture displayed upon the liquid crystal monitor 20 becomes similar to the picture at the time instant t(x) (i.e. the picture corresponding to the photographic range 51 of FIG. 5(*a*)). Accordingly, in the example of FIG. 5 described above, the shift direction of the picture for correction of the photographic picture for hand tremor becomes the downward direction. In other words, the shift (correction) direction of the picture due to hand tremor becomes opposite, according as to whether the picture of the subject to be corrected for hand tremor of the operator is the projection picture or is the photographic picture. With this portable telephone device with incorporated projector 10, it is possible to perform this correction for vibration or wobbling of the photographic picture, and to record the photographic image data which has thus been corrected for wobble due to hand tremor upon the memory card 105, while projecting this picture which has been corrected for wobbling of the picture. At this time, the direction for correction of the wobbling of the projection picture, and the direction for correction of the wobbling of the photographic picture, are opposite. Furthermore, it is also the same for the correction of the wobbling of the projection picture, and for the correction of the wobbling of the photographic picture, if changing over of them is performed by actuation of the first actuation member 112, for example (in other words, if changing over is performed between the projection mode in which picture projection is performed, and the photographic mode in which photographic recording is performed). Even further, if the hand tremor is detected by a sensor such as a gyro or the like, then, in the same manner, the direction for correction of the wobbling of the projection picture (the picture shift direction), and the direction for correction of the wobbling of the photographic picture (the picture shift direction), are opposite.

Since, generally, "hand tremor" originates in a rotational movement in which the arm of the operator or the like rotates around a joint as a fulcrum, accordingly it is considered that the movement engendered in the portable telephone device with incorporated projector 10 will be almost parallel movement. Therefore, here, if "hand tremor" has been decided upon, then the portable telephone device with incorporated projector 10 is treated as having been parallel shifted.

Figure 8:
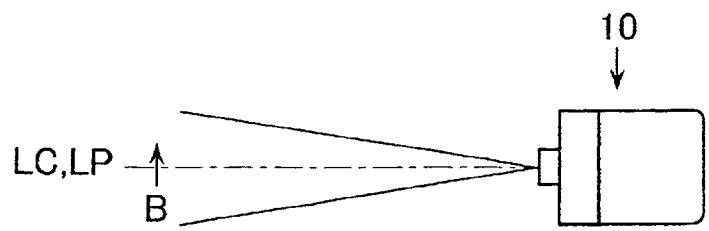
FIG. 8 is a figure for explanation of the relationship between the photographic direction by the camera unit and the projection direction by the projector module: (a) is a figure when the photographic direction and the projection direction are the same, while (b) is a figure when the photographic direction and the projection direction are 180° apart, and (c) is a figure when the photographic direction and the projection direction are 90° apart.
Figure 8:
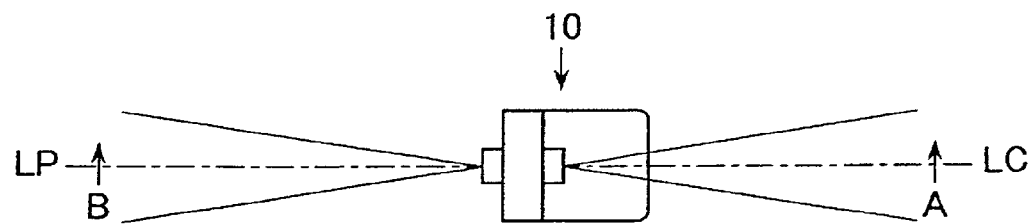
Figure 8:
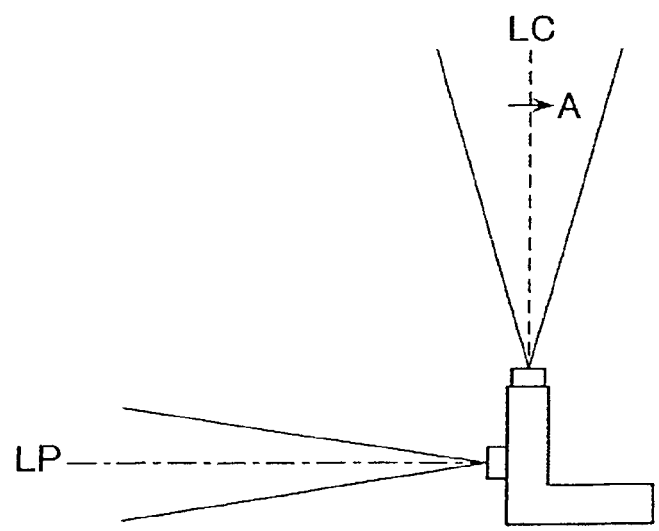

It would also be acceptable for the photographic picture which includes the six blocks 51*a*~51*f* which are used for calculation of the movement vector not necessarily to include the screen S in its photographic range 51. In other words, it would also be acceptable for the direction of photography by the camera unit 200, and the direction of projection by the projector module 6, not to be the same. FIGS. 8(*a*) through (*c*) are figures for explanation of the relationship between the direction of photography by the camera unit 200, and the direction of projection by the projector module 6. FIG. 8(*a*), which is a plan view, is a figure showing the case when the photographic direction and the projection direction are the same. The optical axis of the camera unit 200 is denoted by LC, and the optical axis of the projector module 6 is denoted by LP. When the vibration correction calculation circuit 208 has calculated a representative vector shown by the arrow sign B (the direction to the right in the photograph), the CPU 101 controls the projector module 6 so as to displace the projection picture in the direction to eliminate the movement of the arrow sign B.

And FIG. 8(*b*), which is a plan view, is a figure showing the case when the photographic direction and the projection direction are 180° apart. The optical axis of the camera unit 200 is denoted by LC, and the optical axis of the projector module 6 is denoted, by LP. When the vibration correction calculation circuit 208 has calculated the representative vector shown by the arrow sign A (the direction to the left in the photograph), the projection picture is shifted in the same manner as in the case in which a representative vector shown by the arrow sign B as in the case of FIG. 5(*a*) is calculated (corresponding to the direction to the right in the photograph, in the case of FIG. 5(*a*)). Accordingly, the CPU 101 controls the projector module 6 so as to displace the projection picture in the direction to eliminate movement in the direction of the arrow sign B.

And FIG. 8(*c*), which is a side view, is a figure showing the case when the photographic direction and the projection direction are 90° apart. The optical axis of the camera unit 200 is denoted by LC, and the optical axis of the projector module 6 is denoted by LP. When the vibration correction calculation circuit 208 has calculated the representative vector shown by the arrow sign A (the direction to the right in the photograph), while the projection picture is not shifted, the focus of the projection image deviates, since the distance from the portable telephone device with incorporated projector 10 to the screen S changes. Accordingly, the CPU 101 controls the projector module 6 so as to perform focus adjustment of the projection picture. In concrete terms, based upon a control signal outputted from the CPU 101, the lens drive unit 66 drives a focus lens (not shown in the figures) which is included in the projection lens 61 forwards and backwards along the direction of the optical axis, and thereby adjusts the focus of the projection image.

Although FIGS. 8(*a*)~(*c*) are figures showing cases when the orientation of the representative vector has been calculated in the horizontal direction with respect to the photographic direction, the same holds for the case of calculating it in the vertical direction with respect to the photographic direction. In the above described FIGS. 5(*a*) and (*b*), the photographic direction and the projection direction are the same, and this corresponds to the case in which the vibration correction calculation circuit 208 has calculated the representative vector in the vertical photographic direction.

And, when the representative vector has been calculated in a sloping direction, the projector module 6 is controlled so as to make the projection picture be displaced in the direction to cancel this movement in the sloping direction.

The processing when no movement vector can be detected from the picture of a block extracted by the vibration correction calculation circuit 208 will now be explained. The case that it is not possible to detect a movement vector is the state that it is not possible to calculate any movement because no distinguishing portion including any contrast information such as a contour or the like exists in the image data. And if, in the 6 blocks which have been extracted for calculating the movement vector, any blocks exist in which it is not possible to calculate a movement vector, then the vibration correction calculation circuit 208 calculates the representative vector by using only the blocks in which movement vectors have been calculated, excluding these blocks in which detection has not taken place.

If the photographic direction and the projection direction are the same as shown in FIG. 8(*a*), then, if it has not been possible to detect a movement vector in any one of the 6 blocks which have been extracted, the vibration correction calculation circuit 208 sends a signal to the CPU 101 via the photographic unit control CPU 203 which indicates that no movement vector has been detected. Upon receipt of this movement vector not detected signal, the CPU 101 controls the projector module 6 so as to perform zoom adjustment of the projection image. In concrete terms, based upon a control signal which is outputted from the CPU 101, the lens drive unit 66 drives a zoom lens (not shown in the figures) which is included in the projection lens 61 forwards and backwards in the direction of the optical axis, and thereby performs zoom adjustment so as to make the projection range upon the screen S smaller.

When the projection range upon the screen S is made smaller, the area other than the projection range upon the screen S becomes enlarged. And the vibration correction calculation circuit 208 enlarges the size of the extracted blocks 51a~51f in inverse proportion to the shrinkage of the projection range by the projector module 6. As a result, the possibility becomes high that the frame of the screen S, a mark which is printed upon the screen S, or a stationary object such as dirt or dust or the like will be present adhered to the screen S in the extracted blocks 51a~51f which have been enlarged, and that a movement vector will come to be detected based upon these. It should be understood that, by obtaining information which shows the zoom magnification of the projector module 6 via the CPU 101 and the photographic unit CPU 203, it is possible to enlarge the size of the extracted blocks so as not to include the projection range by the projection module 6. In this manner, even if no stationary object is present in the neighborhood of the screen, so that it is not possible to obtain contrast information from such a stationary object, nevertheless it becomes possible to make it easy to detect a movement vector by enlarging the extracted blocks 51a~51f. And, conversely to the above, the same beneficial effect may also be obtained by arranging to enlarge the photographic range by the camera unit 200 by driving the photographic lens 5, and by, along with this, increasing the size of the extracted blocks 51a~51f.

The embodiment explained above will now be summarized.

(1) The portable telephone device with incorporated projector 10 starts projection by the projector module 6 when the relative angle θ is set to the projection attitude of 80° and three seconds has elapsed. At this time, if the setting is made for performing vibration correction processing, then the camera unit 200 is commanded to start photographing frame pictures continuously. Since the start of projection and the start of photography are performed automatically, accordingly the convenience of use is enhanced, since specific actuation is eliminated.

(2) The portable telephone device with incorporated projector 10 calculates six movement vectors by comparing pictures between successive frames which have been photographed by the image sensor 201, and which are larger than the projection region. Along with making a decision as to "hand tremor" based upon these movement vectors which have been calculated, these six movement vectors are averaged together, and thereby the representative vector is also calculated. Furthermore, the portable telephone device with incorporated projector 10 creates picture shift information for canceling this representative vector, and, if "hand tremor" has been decided upon, corrects the projection image using this picture shift information so as to suppress vibration or wobbling of the projection contents due to the projector module 6. As a result, it is possible to suppress wobbling of a picture or characters or the like being projected upon the screen S, even if the portable telephone device with incorporated projector 10, which is being hand-held, is subjected to "hand tremor", and it is possible to alleviate any uncomfortable feeling which the observer may experience, since from the point of view of an observer this image seems to be stationary.

(3) Since it is arranged to make the decision as to "hand tremor" by comparing together pictures between successive frames which have been captured by the image sensor 201, accordingly it is possible to keep down the cost and the consumption of electrical power, as compared to the case of using a gyro or the like.

(4) The six movement vectors described in (2) above are calculated from the six blocks 51a~51f within the picture of the photographic range 51, but which do not include the projection range upon the screen S. Since it is arranged for it to be possible to change the mutual directional relationship so that the direction of photography by the camera unit 200 and the direction of projection by the projector module 6 do not coincide with one another, accordingly it is simple and easy to photograph a region other than the projection range (in other words, by eliminating the projection range from the photographic range 51).

(5) Furthermore, since it is arranged for it to be possible to adjust the photographic angle of view so that the range 51 of photography by the camera unit 200 becomes wider than the range of projection by the projector module 6, accordingly it is easy to perform photography of a region other than the projection range, even if the photographic direction and the projection direction are the same.

(6) If as shown in FIG. 8(a) the photographic direction and the projection direction are the same, then, if it has not been possible to calculate any movement vector for any one of the six blocks 51a~51f, it is arranged to perform zoom adjustment of the image projected by the projector module 6, so as to make the projection range upon the screen S smaller. On the other hand, the size of the above described six blocks is magnified in inverse proportion to the shrinkage of the projection range. As a result, the chance that the frame of the screen S, a mark, or some dust or waste or the like is present in the blocks 51a~51f becomes high, and it is possible to make it easy to calculate a movement vector based upon this type of contact information.

Variant Embodiment #1

In the above explanation, electronic correction was performed by shifting the optical image upon the liquid crystal panel 52 in order to suppress vibration or wobbling of the projection contents upon the screen S caused by "hand tremor". Instead of this, it would also be acceptable to arrange to provide a structure in which the relative positional relationship between the liquid crystal panel 62 and the projection lens 61 is shifted mechanically in a plane orthogonal to the optical axis of the projection lens 61, in order to eliminate the representative vector. Furthermore, it would also be acceptable to arrange to provide a structure in which trembling of the projected picture is corrected by performing optical correction using a variable apical angle prism.

Variant Embodiment #2

Although, in the above description an example has been explained in which the projector module 6 projects a still picture as the projection picture P, when setting has been established for performing vibration correction processing, it would also be acceptable to arrange to project characters or symbols, or a pointer, instead of a picture. Furthermore it would also be acceptable, if a still picture is being projected as the projection picture P, for it to be one in which the blocks 51a~51f are included within the projection range.

Variant Embodiment #3

Furthermore, when the setting has been established for performing vibration correction processing, it would also be acceptable to arrange for the projector module 6 to project a moving picture as the projection picture P. In the same manner as when projecting a still picture, the projector module 6 is controlled so that the projected picture is displaced so as to cancel the representative vector which is calculated. It should be understood that this moving picture may be an image which is received by the TV tuner 106, an image which is received by the communication control unit 110, or a picture which is being replayed based upon the data recorded upon the memory card 105. When a projection region by the projector module 6 is present within the range of photography by the camera unit 200, and vibration correction processing is being performed, then the CPU 101 prohibits the successive frames of pictures which are photographed in real time by the camera unit 200 from being projected as a moving picture. This is because projecting upon the screen S a picture which has been shifted so as to eliminate wobbling of the projection contents, and performing image-capturing with the camera unit 200 so as to include this screen S, would give rise to an undesirable infinite chain situation between the projection contents and the photographic contents, which would give an uncomfortable feeling to a person who is observing the screen S. Furthermore, since the six blocks 51a~51f are set in a region which excludes the projection range, accordingly detection of movement of an image within the moving picture which is being projected, and mistaken decision of "hand tremor" based thereupon, which would be undesirable, is prevented.

Variant Embodiment #4

If the setting has been established for performing vibration correction processing, then it would be acceptable to adjust the zoom range so that the projection range by the projector module 6 is made to be smaller, as compared to its projection range when vibration correction processing is not being performed. Since, by doing this, it is possible to keep a moving range within the periphery of the projection range upon the screen S, accordingly, even if the projection image should wobble due to "hand tremor", it is possible to prevent the edge portion of the projection image immediately getting outside the screen S Variant Embodiment #5

Furthermore, if the setting has been established for performing vibration correction processing, it would also be acceptable to arrange to project illumination light only upon a predetermined region which is the neighborhood of the border within the range of projection by the projector module 6, not including information such as a picture or text or the like. In other words, the projection contents is not displayed in a predetermined region which is the neighborhood of the border within the projection range of the liquid crystal panel 62, but the projection light in this region is used as the above described illumination light. Since, when calculating the movement vector based upon the frame, a mark, or dust or dirt of the like on the screen S, the luminance of the pictures of the extraction blocks is high, accordingly it is possible to suppress noise in the photographic picture, and to enhance the accuracy of the calculation of the movement vector.

Variant Embodiment #6

In the example described above, it was arranged for photography to be performed by the camera unit 200 so as to include the desk 100 and the screen S and the flower pot U within the photographic range 51, for the vibration correction calculation circuit 208 to extract from the picture of the photographic range 51 the blocks 51a~51f in which the projection range upon the screen S was not included, and for the picture shift information to be obtained based upon the image data within these blocks. Instead of this, it would also be acceptable to photograph only a region which does not include the projection range upon the screen S, but which includes a stationary object (for example, the desk 100, the flower pot U, or a frame portion of the screen S), and to obtain the picture shift information from this image data. In this case it is possible to control the displacement of the picture projected by the projector module 6 more accurately, by providing a structure which can calculate the distance from the portable telephone device with incorporated projector 10 to the screen S, and the distance from the portable telephone device with incorporated projector 10 to the stationary object. The distance to the screen S or the stationary object may be calculated, for example, by a range finder device for the camera unit 200, or a range finder device for the projector module 6, or the like.

Variant Embodiment #7

Furthermore, in the example described above, a structure was explained in which vibration or tremble of the photographic picture and of the projection picture was correction based upon the signal outputted from the image sensor 201. In that example, when correcting for tremble in the photographic picture and in the projection picture, the image sensor 201 is endowed with the function of detecting the vibration, thus serving as a vibration detection sensor. Detection of vibration is performed by the vibration correction calculation circuit 208 based upon the output signal of the image sensor 201, and a vibration detection signal is outputted. It would also be acceptable to provide a structure in which a gyro, an angular velocity sensor, or an acceleration sensor is employed as a vibration detection sensor which is used when correcting vibration of the photographic picture and of the projection picture. In this case, it would be acceptable for the projection surface of the projector module 6 to be the surface of, or internal to, the body. If this type of structure is employed, it is not necessary to use separate vibration detection sensors when performing vibration correction of the photographic picture and correction for tremble of the projected picture, so that and thus it is possible to make the device more compact, and to implement a reduction of the electrical power consumption.

Variant Embodiment #8

Although, as an example of the structure of the projector module 6, a case was explained in which the optical image formation element was made by using the liquid crystal panel 62, and an optical image was obtained by illuminating the image on the liquid crystal panel 62 with light from the LED light source 63, it would also be acceptable to provide a structure using an optical image formation element of a type which itself emits light. In this case, such an optical image formation element is made as an array of point light sources which correspond to pixels, and the optical image formation element creates an optical image by causing light to be emitted from each picture element at a luminance corresponding to the picture signal. If such a self light emitting type of optical image formation element is employed, then the LED light source 63 may be omitted. Furthermore, the light source is not limited to being an LED light source; it could also be a light source of some other type.

Variant Embodiment #9

For the optical image formation element, it would also be acceptable to use a micro mirror element in which micro mirrors corresponding to the pixels are arrayed. If such an optical image formation element in which a micro mirror element is used, then the light from the LED light source 63 illuminates the micro mirror element.

Variant Embodiment #10

Although, by providing the rotational mechanism which allowed the camera unit 200 to rotate, it was arranged for the relationship between the direction of image-capturing or photography by the camera unit 200 and the direction of projection by the projector module 6 to be varied freely, it would also be acceptable to provide a structure in which, by making it possible to rotate the projector module 6 or the like, it is possible to vary the projection direction, instead of the direction of the camera unit 200. Furthermore, it would also be acceptable to provide a structure in which it is possible to rotate both the camera unit 200 and the projector module 6.

Variant Embodiment #11

It was arranged, if the photographic direction and the projection direction are the same as shown in FIG. 8(*a*), to reduce the projection range by adjusting the zoom on the side of the projector module 6, if calculation of a movement vector has not been possible. Instead of this, it would also be acceptable to widen the photographic range by adjusting the zoom on the side of the camera unit 200.

Variant Embodiment #12

Figure 9:
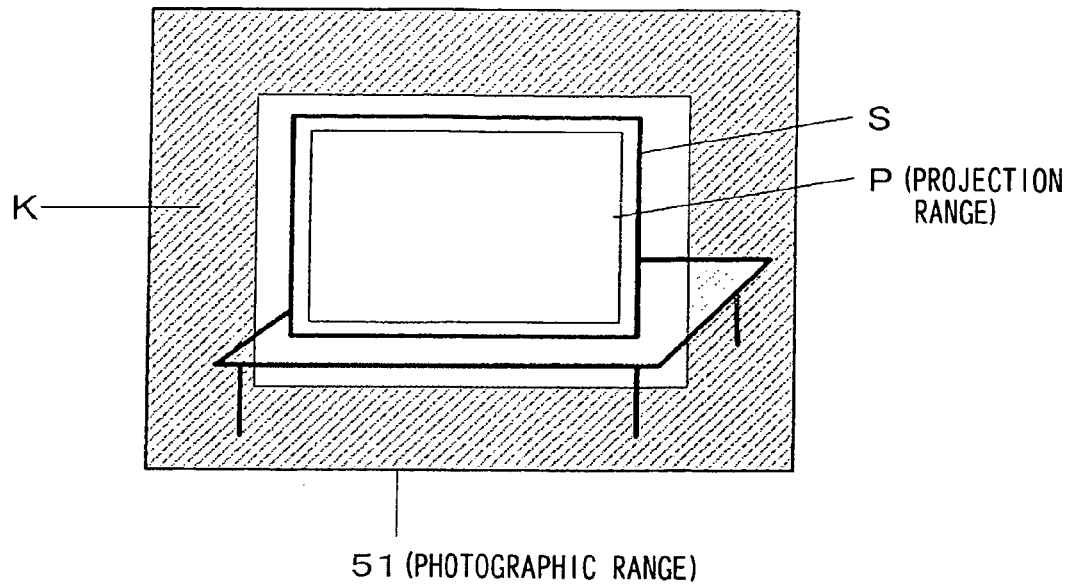
FIG. 9 is a figure for explanation of a photometric area in a variant embodiment.

It would also be acceptable, when the camera unit 200 is performing image-capturing or photography while a picture is being projected by the projector module 6, to determine the exposure during photography based upon the brightness of a region upon the screen S which does not include the projection range, but which includes a block within the photographic range for extraction of the movement vector. FIG. 9 is a figure for explanation of the photometric area in this case. In FIG. 6 in the hatched region K from the photographic range 51 corresponding to the picture of one frame excluding at least the projection range P upon the screen S, the luminance is low as compared to the projection range P. Due to this, when the exposure is determined according to the luminance of the subject or the object to be photographed which has been calculated based upon the image data including the projection range P for which the luminance is high (for example, when averaging photometry is performed by determining the exposure by averaging the luminance over the entire area of the photographic range 51), then the region K is photographed as dark, which is undesirable. Since the above described blocks 51*a*~51*f* are included in the region K, accordingly detection of the characteristic portions which include the contrast information from this data which has been photographed as dark becomes difficult, and it becomes difficult to calculate an accurate movement vector.

Thus, an adequate exposure for the above described blocks 51*a*~51*f* is obtained by the CPU 101 determining an exposure according to the brightness of the subject to be photographed which has been calculated, based upon the signal values of the image data for the region K which includes the blocks for movement vector extraction, but excludes the projection range P. By doing this, the movement vector becomes easy to calculate, and it is possible to control the displacement of the projection picture by the projector module 6 more accurately.

Variant Embodiment #13

Furthermore if, during photography by the camera unit 200, in the region K, the luminance of the subject to be photographed is deficient, then the CPU 101 may, for example, perform gain increase of the image data in the region K. Since, by doing this, it becomes possible to obtain data of an adequate signal level for the above described blocks 51*a*~51*f*, and it becomes easy to calculate the movement vector, accordingly it is easy to control the displacement of the projection picture by the projector module 6 more accurately. It should be understood that it would also be acceptable to perform a combination of the processing of Variant Embodiment #12 and the processing of Variant Embodiment #13. Moreover, it would also be acceptable to provide a structure in which, instead of the above described processing to increase the gain, the shutter speed of the photographic element was decreased, or the aperture was opened up so as to increase the amount of light which is incident upon the photographic element 201. This processing to increase the gain, to change the shutter speed, or to change the aperture opening, is performed by a level increase processing unit (the photographic unit control CPU 203, or the picture processing circuit 207).

Second Embodiment

It would also be acceptable to arrange for the camera unit 200 not to perform photography while a picture is being projected with the projector module 6, but rather to perform the projection by the projector module 6 and the photography by the camera unit 200 by time division.

Figure 10:
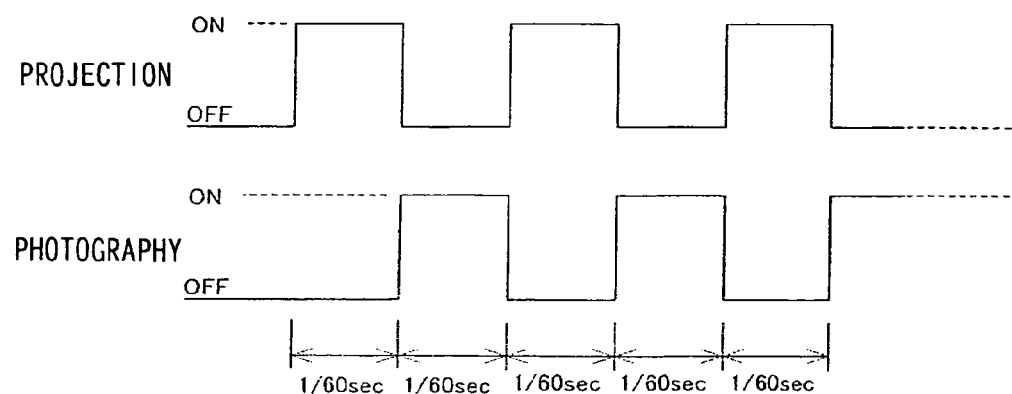
FIG. 10 is a figure for explanation of projection timing and photographic timing.

FIG. 10 is a timing chart for explanation of the projection timing and the photographic timing. The LED drive unit 64 of the projector module 6 causes the LED light source 63 to emit blinking light, according to a LED drive signal from the CPU 101, so as to repeatedly light up and turn off every 1/60 of a second. By illuminating the liquid crystal panel 62 with this blinking light, the projection image upon the screen S blinks at a period of 1/30 second.

On the other hand, the photographic unit control CPU 203 of the camera unit 200 starts photography of a picture frame upon a photographic command from the CPU 101. Here, along with making the photographic interval between frames (the interval for taking photographic pictures) 1/30 of a second, also, photography is performed (i.e. photographic electric charge is accumulated upon the photographic element 201) while the LED light source 63 is OFF (extinguished) (in other words, during the 1/60 second in which the projection image upon the screen S (FIG. 6) is OFF (i.e. is in the non displayed state)).

The CPU 101 obtains the picture shift information using the pictures which are photographed at the timing described above. In other words, the predetermined blocks (in the example of FIG. 6, the blocks 51*a*~51*f*) are extracted from within the picture of the photographic range 51 (FIG. 6) corresponding to one picture frame, and the picture shift information is obtained based upon the image data within these blocks. It should be understood that since, in this second embodiment, the projection image upon the screen S is OFF, accordingly there will be no problem even if the block positions are set so that the screen S is included in the blocks 51*a*~51*f*.

The CPU 101 sends a command to the liquid crystal drive unit 65 of the projector module 6, and then, according to the picture shift information which has thus been obtained, the optical image upon the liquid crystal panel 62 is shifted. As a result, as shown in FIG. 7, the person H in the projection picture P upon the screen S is projected in the central portion of the screen S, and, from the point of view of a person who is observing the projection picture upon the screen S, that person H appears to be stationary.

According to the second embodiment explained above, the following operation and beneficial effects are obtained.

(1) Projection by the projector module 6 and image-capturing by the camera unit 200 are performed alternately, and it is arranged to obtain the picture shift information which is necessary for correction of the projection image performed in order to cancel vibration or wobbling of the projection image originating in "hand tremor" caused to the portable telephone device with incorporated projector 10, using the photographic pictures which are taken while the projection image is OFF. Since, due to this, it would also be acceptable not to widen the range of photography by the camera unit 200 wider than the range of projection by the projector module 6 (in other words, it would also be acceptable for the screen S to be included in the blocks 51*a*~51*f*, which is different from the case in the first embodiment), accordingly it is possible to reduce the labor required for adjusting the photographic angle of view.

(2) In addition to (1) above, since the projection image is OFF during image-capturing or photography by the camera unit 200, so that exposure by the camera unit 200 is controlled based upon the result of photometry with the projection image being OFF, accordingly it is possible to eliminate any danger that the projected light may exert an influence upon the exposure during photography. In other words, the fear that the regions of the blocks 51*a*~51*f* may be photographed as dark is eliminated, and, since it is easy to calculate the movement vector, accordingly it is possible to control the displacement of the projection picture by the projector module 6 more accurately.

(3) Since it is arranged to turn ON and turn OFF the light projected by the projector module 6 repeatedly at a period of ⅟₆₀ seconds, accordingly, from the point of view of a person who is observing the projected image upon the screen S, the projected image appears as though it was always ON, and he does not experience any uncomfortable feeling due to flickering.

Variant Embodiment #14

The interval at which the LED light source 63 is driven ON and OFF is not limited to being ⅟₆₀ second as described above; it would also be acceptable for this interval to be made shorter.

Variant Embodiment #15

If the light emission control of the LED light source 63 is performed by a PWM method, or if it is driven so as to be caused to emit light sequentially of the various colors R, G, and B, then it will be acceptable to arrange to perform photography with the camera unit 200 in the state in which each of the respective light sources is turned OFF.

Variant Embodiment #16

If, during photography with the camera unit 200, the luminance of the subject to be photographed is insufficient, then, instead of turning the LED light source 63 OFF, it would also be acceptable to emit only illumination light (for example, to project white colored light) at a low luminance, not including any information such as a picture or text or the like. By doing this it is possible to enhance the accuracy by which the movement vector is calculated, since the luminance of the images of the above described predetermined blocks is high.

Variant Embodiment 17

Furthermore, if during photography with the camera unit 200, the luminance of the subject to be photographed is insufficient, then the CPU 101 may, for example, perform increase of the gain of the image data which has been captured. By doing this, data of an adequate signal level comes to be obtained for the above described blocks 51*a*~51*f*, and, since it becomes easy to calculate the movement vector, accordingly it is possible to control the displacement of the projection picture by the projector module 6 in a more accurate manner. It should be understood that it would also be acceptable to perform the processing of Variant Embodiment #16 and the processing of this Variant Embodiment #17 in combination. Moreover, instead of the above described processing to increase the gain, it would also be acceptable to provide a structure which decreases the shutter speed of the photographic element 201, or which opens up the aperture, so that the amount of light which is incident upon the photographic element 201 is increased. This processing to increase the gain, or to change the shutter speed, or to change the aperture opening, is performed by a level increase processing unit (the photographic unit control CPU 203 or the picture processing circuit 207).

Although, in the above explanation, examples were explained in which the projector module 6 and the camera unit 200 were mounted to the portable telephone device with incorporated projector 10, it would also be possible to apply the present invention to an electronic device such as a notebook type personal computer with incorporated projector and camera, a PDA with incorporated projector and camera, an electronic camera with incorporated projector, or the like.

And although, in the embodiments described above, it was arranged to start image-capturing or photography by the camera unit 200 automatically if the setting is established for performing vibration correction processing at the time point that projection by the projector module is started, it would also be acceptable to arrange to provide a structure in which the start of photography was commanded manually. Furthermore although, in the embodiments described above, examples were explained in which the portable telephone device with incorporated projector 10 is used by being handheld, it would also be possible to apply the present invention to a case in which the relative positional relationship between the holding state or mounting state of the portable telephone device with incorporated projector 10 and the projection surface changes along with time.

Although the details of various embodiments have been explained in the above description, the present invention is not to be considered as being limited by the contents thereof. Other modes which are considered to lie within the range of the technical concept of the present invention are also included within its scope.

The content of the disclosure of the following application upon which priority right is claimed is hereby incorporated by reference:

Japanese Patent Application 2004-273416 (filed Sep. 21, 2004).

The invention claimed is:

1. An electronic device, comprising:
an image-capturing device that captures an image of a subject in an image-capturing range and outputs an image signal;
a projector device that projects a projection image in a projection range on a screen that is remote from a body, the projection image corresponding to a projection image data formed by an optical image formation element, the projector device and the image-capturing device being housed integrally within the body;
a range change unit that changes at least one of a size of the image-capturing range and a size of the projection range during the projector device projecting the projection image, so that the image-capturing range of the image-capturing device and the projection range of the projector device do not coincide with one another;
a calculation unit that calculates an amount of change of the image signal with time, by using an image signal output from an image signal extraction range corresponding to the image of the subject excluding the projection range; and
a correction unit that corrects a position of the projection image according to the calculated amount of change in order to correct a vibration of the projection image;
wherein if the amount of change cannot be calculated by the calculation unit, the calculation unit widens the image signal extraction range so as to calculate the amount of change by using the widened image signal extraction range.

2. An electronic device according to claim 1, wherein:
the range change unit changes one of the image-capturing range and the projection range, so that the image-capturing range becomes larger than the projection range.

3. An electronic device according to claim 1, wherein:
if the amount of change cannot be calculated by the calculation unit, the projector device narrows down the projection range, and the calculation unit widens an image signal extraction range used in the calculation of the amount of change.

4. An electronic device according to claim 1, wherein:
if the amount of change cannot be calculated by the calculation unit, the image-capturing device widens the image-capturing range, and the calculation unit widens an image signal extraction range used in the calculation of the amount of change.

5. An electronic device according to claim 4, wherein:
the projector device irradiates illumination light upon a periphery within the projection range.

6. An electronic device according to claim 1, wherein:
the image-capturing device starts image-capturing according to a command for starting projection by the projector device.

7. An electronic device according to claim 1, wherein:
the projector device projects the projection image corresponding to the projection image data formed by using the image signal outputted from the image-capturing device; and
the projector device prohibits the projection of the projection image corresponding to the projection image data formed by using the image signal outputted from the image-capturing device, when the correction unit is performing correction.

8. An electronic device according claim 1, further comprising:
an exposure calculation unit that determines an exposure during image-capturing by the image-capturing device, based upon a luminance of the subject, wherein:
the exposure calculation unit calculates the luminance of the subject using an image signal that corresponds to the image of the subject excluding the projection range.

9. An electronic device according to claim 8, further comprising:
a level increase processing unit that increases a level of the image signal corresponding to the image of the subject excluding the projection range by the projector device, wherein:
the calculation unit calculates the amount of change using the image signal upon which a level increase processing has been performed.

10. An electronic device, comprising:
an image-capturing device that captures an image of a subject that is in a predetermined direction from the electronic device and outputs an image signal;
a projector device that projects a projection image along the predetermined direction, the projection image corresponding to a projection image data formed by an optical image formation element, and the projector device and the image-capturing device being integrally provided;
a vibration detection unit that detects vibration and outputs a vibration detection signal; and
a correction unit that corrects the image signal and the projection image data based upon the vibration detection signal, in order to correct a vibration of the image of the subject and the projection image, wherein:
when the vibration has been detected by the vibration detection unit, the correction unit performs correction by shifting the image signal along a first shift direction and shifting the projection image data along a second shift direction, the first shift direction and the second shift direction being opposite to each other.

11. An electronic device according to claim 10, wherein:
the image-capturing device starts image-capturing according to a command for starting projection by the projector device.

12. An electronic device according to claim 10, wherein:
the projector device projects the projection image corresponding to the projection image data formed by using the image signal outputted from the image-capturing device; and
the projector device prohibits the projection of the projection image corresponding to the projection image data formed by using the image signal outputted from the image-capturing device, when the correction unit is performing correction.

* * * * *